United States Patent
Auman

(10) Patent No.: US 11,492,273 B2
(45) Date of Patent: Nov. 8, 2022

(54) MEMBRANE MODULE MANIFOLD WITH INTEGRATED END CAPS

(71) Applicant: Ovivo Inc., Montreal (CA)

(72) Inventor: Trevor Robert Auman, Sandy, UT (US)

(73) Assignee: Ovivo Inc., Montreal (CA)

( * ) Notice: Subject to any disclaimer, the term of this patent is extended or adjusted under 35 U.S.C. 154(b) by 55 days.

(21) Appl. No.: 17/087,119

(22) Filed: Nov. 2, 2020

(65) Prior Publication Data

US 2022/0135444 A1    May 5, 2022

(51) Int. Cl.
    *C02F 1/44*    (2006.01)

(52) U.S. Cl.
    CPC ........ *C02F 1/444* (2013.01); *C02F 2201/004* (2013.01); *C02F 2201/007* (2013.01)

(58) Field of Classification Search
    USPC ........................................................ 210/230
    See application file for complete search history.

(56) References Cited

U.S. PATENT DOCUMENTS

| 8,709,252 B2 | 4/2014 | Gabriel et al. | |
| 2005/0000881 A1* | 1/2005 | Bruss | B01D 63/00 210/321.79 |
| 2006/0163142 A1* | 7/2006 | Nonninger | B01D 29/39 210/299 |
| 2009/0236295 A1* | 9/2009 | Braun | C02F 1/444 210/450 |
| 2009/0314710 A1* | 12/2009 | Braun | B01D 65/08 210/615 |
| 2022/0062798 A1* | 3/2022 | Auman | B01D 25/12 |

* cited by examiner

*Primary Examiner* — Nina Bhat
(74) *Attorney, Agent, or Firm* — Thomas M. Freiburger

(57) ABSTRACT

Silicon carbide flat sheet filtration membranes are supported on one piece manifold/end cap structures. Ends of a large number of the parallel flat plate membranes are fitted into elongated end cap slots that are part of a single molded manifold/end cap structure, such a structure being at each end of the series of membranes. In addition, a one piece external frame module can be provided to receive the gang of flat plate membranes with attached manifold/end caps. In the event of a damaged plate, the plate can be removed and replaced along with a special end cap repair section. This provides advantages over prior arrangements with individual end caps for each module or potting of the flat plates into a box or chamber.

5 Claims, 8 Drawing Sheets

SECTION A-A

MEMBRANE MODULE MANIFOLD WITH INTEGRATED END CAPS

BACKGROUND OF THE INVENTION

This invention concerns membrane filtration, and particularly apparatus that conducts post-filtration permeate water from flat plate ceramic membranes.

The majority of silicon carbide (SiC) flat sheet suppliers use a flat sheet filter with end caps. These end caps (called end cap type herein) have O-rings and are inserted into a single permeate header. The filtered water travels from the outside of the SiC filter plate, through channels inside the plate, into the end caps and from there into a permeate header. One or two suppliers "pot" the flat plates into a box or chamber (called potted type herein) on the end so that the water travels directly into a void at the end.

The primary issue with the end cap type is the need for a lot of O-rings which can fail and are costly to produce and install. The primary benefit is that the individual flat sheet membranes can be replaced individually if damaged. The primary issue with the potted type is that the polyurethane that is used to "pot" the flat sheet membranes can swell and shrink significantly with temperature changes and in submerged applications. With this expansion and contraction the brittle membrane flat sheets can be shattered. Additionally, by potting the plates an individual sheet cannot be replaced.

The same type of sealant (polyurethane) typically is used in both applications and does not create an issue with the end cap type as the amount of sealant is very small so the impact is very small; additionally there is a little space between plates.

SUMMARY OF THE INVENTION

The invention resolves the above issues with a one piece, preferably integrally-molded manifold and end cap set. With the manifold/end cap structure of the invention the amount of required sealant is significantly reduced and, importantly, O-rings are eliminated. In a primary embodiment of the invention a damaged membrane plate can be replaced; the replacement involves a type of patch to engage with the manifold. Although the one-piece integral design is preferable, the manifold/end cap structure could be formed in several pieces that are assembled together in sealed relationship.

In addition, the invention in one embodiment may include a one piece external frame module that receives a full complement of membranes in an assembly retained by a manifold/end cap structure unit at each end. The assembly, which can include, for example, 20 or 25 membranes, is lowered into place such that the modular frame engages with the end cap/manifold units and helps provide rigid structural support for the membrane plates in service.

An important object of the invention is to eliminate O-rings in flat plate ceramic membrane assemblies while providing a unitary end cap/manifold structure that is efficiently attached to a series of membrane plates, allows replacement of individual membranes and is reliable and rugged in construction.

DESCRIPTION OF PREFERRED EMBODIMENTS

Figure 1:
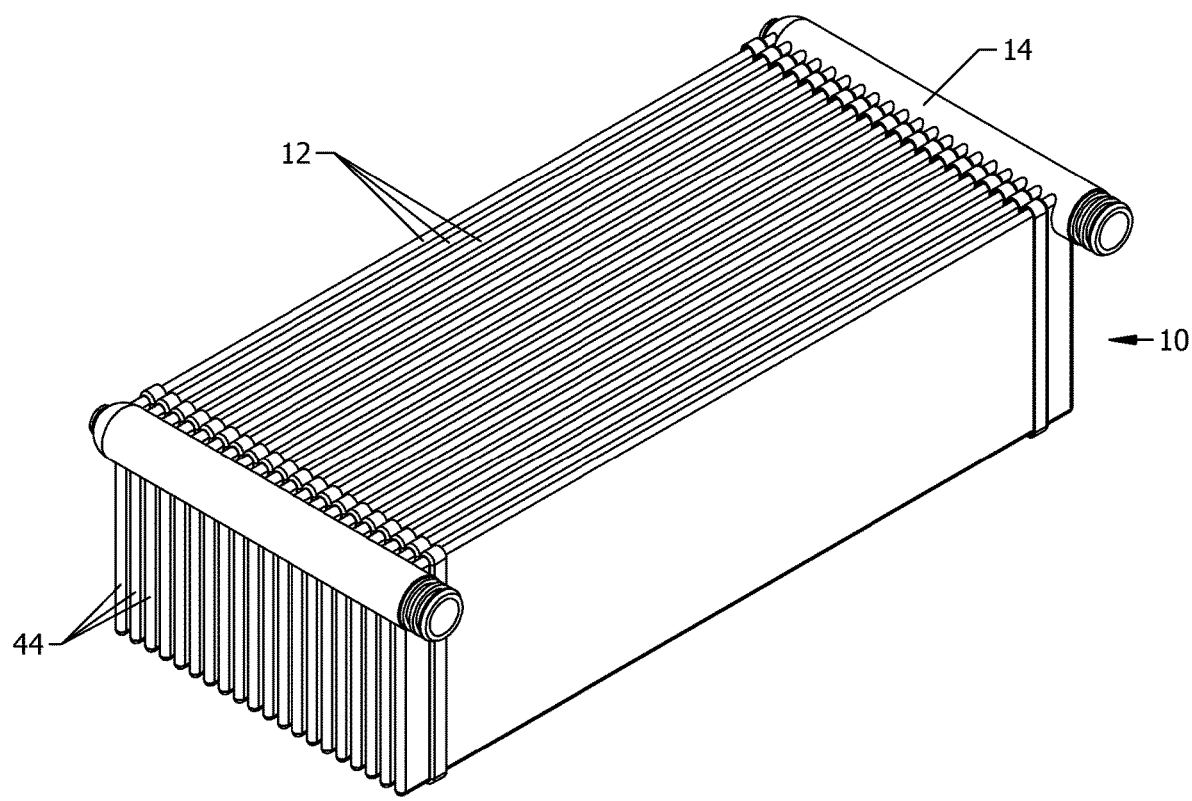
FIG. 1 is a perspective view showing an assembly or cassette of a series of ceramic flat plate membranes, retained at both ends by a manifold/end cap unit of the invention.

In the drawings, FIG. 1 shows an assembly or cassette 10 of a multiplicity of flat plate ceramic filtration membranes 12 (e.g. about 20 or 25 plates), retained together as a unit by end cap/manifolds 14, one at each end of the collection of plates. In some cases the plates could be capped off at one end, so that the end cap/manifold structure is only connected to receive permeate liquid from plates at one end of the plates, the other ends being supported or retained in a suitable way. Each plate has an end received in a slot of a manifold/end cap structure at each end.

Figure 2:
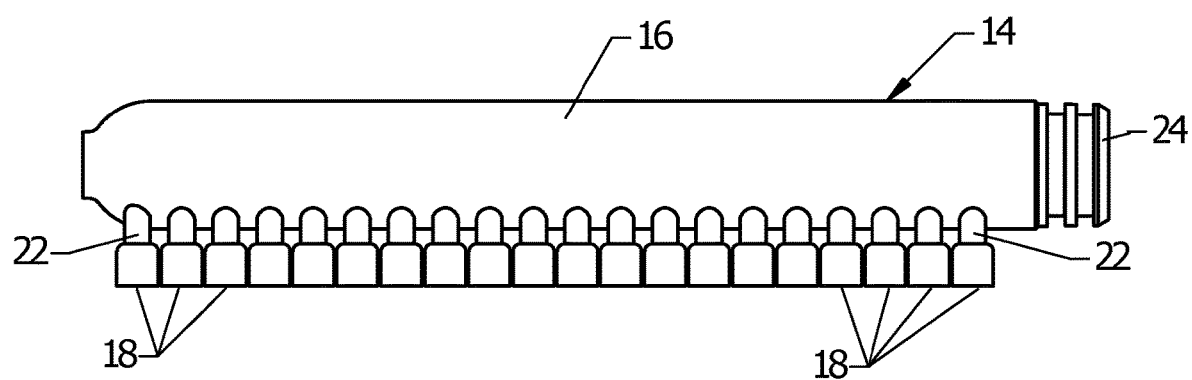
FIG. 2 is a top plan view showing a manifold/end cap unit of the invention.
Figure 3:
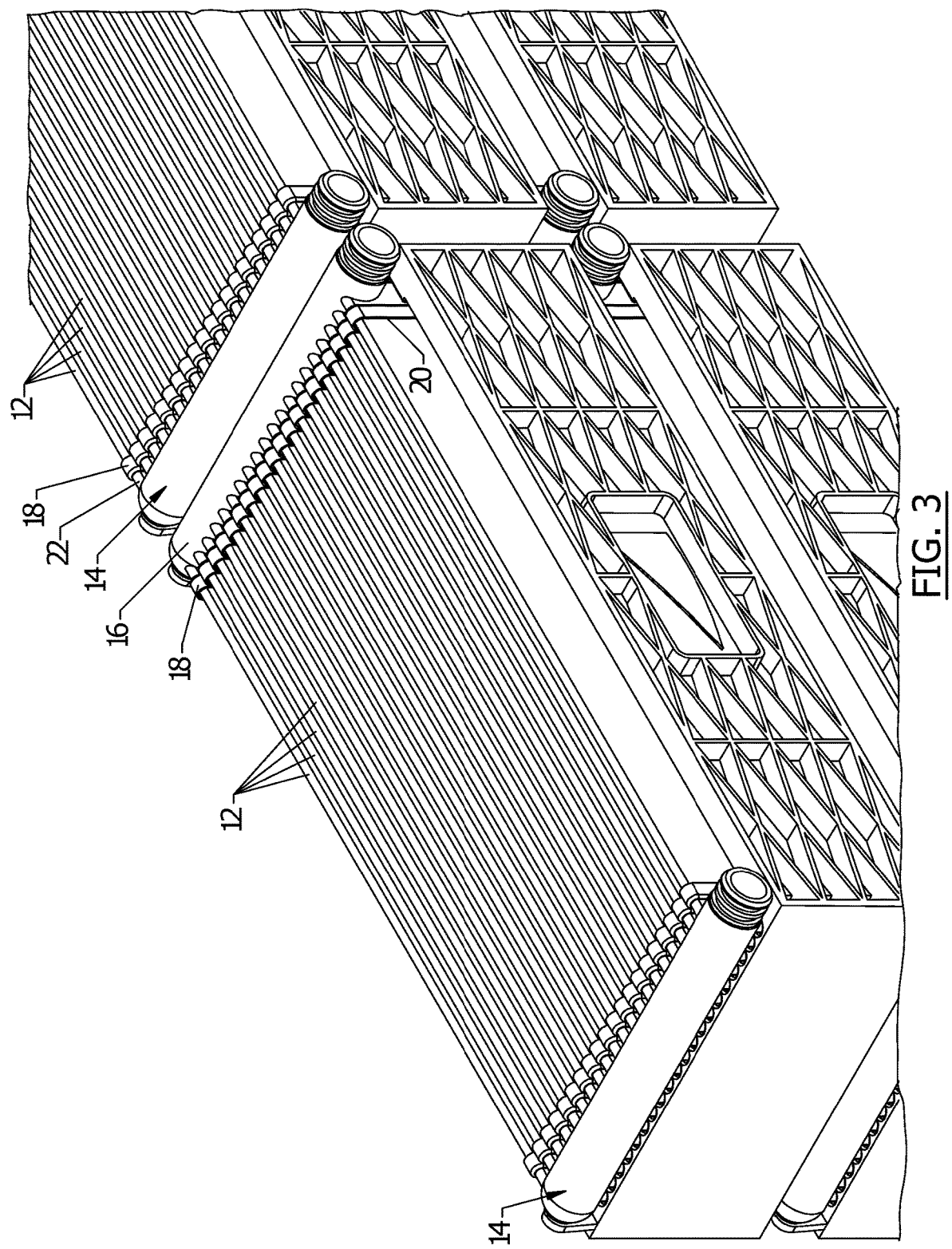
FIG. 3 is a perspective view in greater detail illustrating the invention.

FIG. 2 is a top view showing an end cap/manifold 14, and FIG. 3 also shows these end cap/manifolds 14 in better detail, engaged with the membranes. Each manifold/end cap structure 14 has a header 16 (sometimes referred to as a header pipe), which is a permeate collection pipe, and a series of end caps 18 connected to and in communication with the interior of the header 16. Each end cap is elongated, the full height of the membranes, defining a slot 20 that is sized to closely fit over and receive the end of a membrane plate. The ends of the membrane plates 12 are open and deliver permeate into the end cap, the end caps being securely glued to the membrane plates using cements typically applied to connect prior art end caps to ducts or pipes. As seen in the drawings, structure downstream of the end caps 18 narrows to a neck 22, extending the full height of the membrane plates and end caps, and which is connected at top to the header pipe 16 for delivery of liquid into that header. Preferably the entire structure of the end cap/manifold unit 14 is integrally molded as one piece, of an appropriate plastic material such as Noryl, or a Nylon-ABS mix, or other strong plastics safe for the applied environment which may be sewage treatment.

The narrow necks 22 on the end caps provide flexibility. The securement of the membrane plates with the end caps 18 stood away from the header pipe 16 by the necks 22 enables some limited bending and flexing of the plates, and with the end caps connected for liquid communication only at their tops to the header pipe 16 the plates are securely held but with some flexing permitted, avoiding damage. The end caps 18 may also be connected together at bottoms or elsewhere to add rigidity. As an example, if a manifold/end cap structure is dimensioned as in FIG. 7, the necks have a width of about 7 mm and may stand out from the vertical tangent of the header pipe by about 4-5 mm.

The drawings, including FIGS. 1, 2 and 3, show exit ducts 24 on each end cap/manifold 14. These are for connection to conduits or pipes for removal of the permeate, usually from a series of assemblies. As illustrated, these exit ducts have provision for several large O-rings (not shown) for watertight connections. The end caps 18, however, do not involve O-rings, which in the prior art comprise a multiplicity of smaller O-rings securing end caps to pipes or permeate headers, with some of the O-rings often failing.

Figure 6:
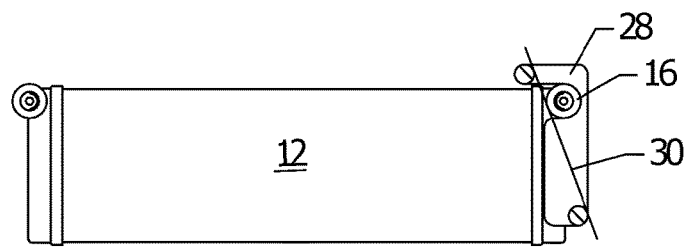
FIG. 6 is a sectional elevation view indicating removal of a damaged membrane plate with the aid of a cutting jig according to the invention.
Figure 4:
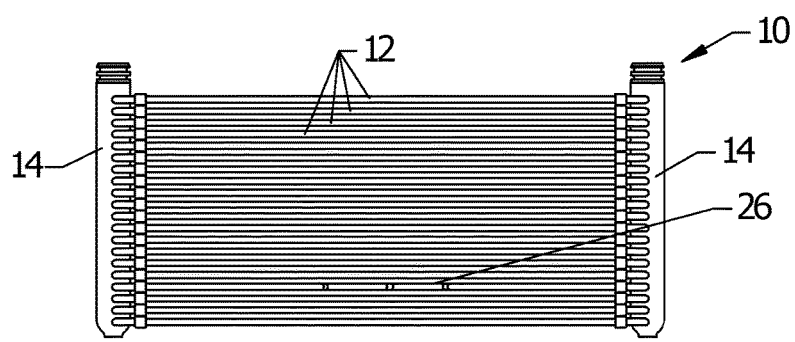
FIG. 4 is a plan view showing the assembly of FIG. 1 and indicating a broken plate among the ceramic membrane plates.
Figure 5:
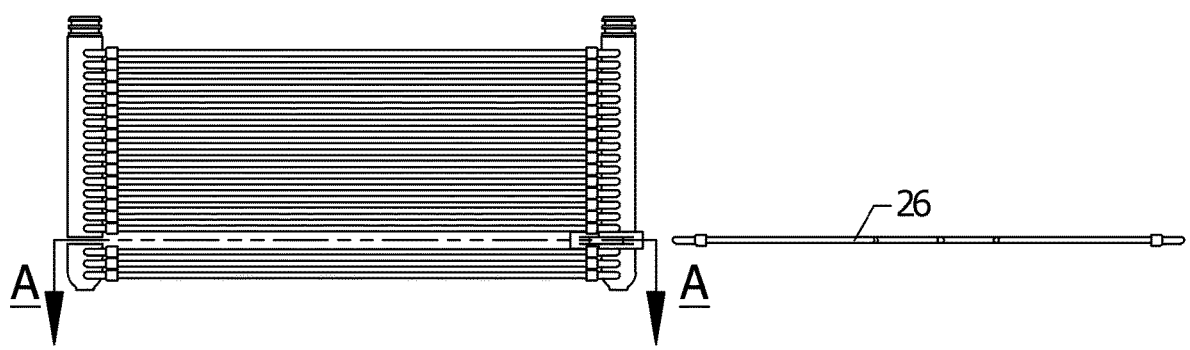
FIG. 5 is a view similar to FIG. 4, showing a broken plate being removed.
Figure 7:
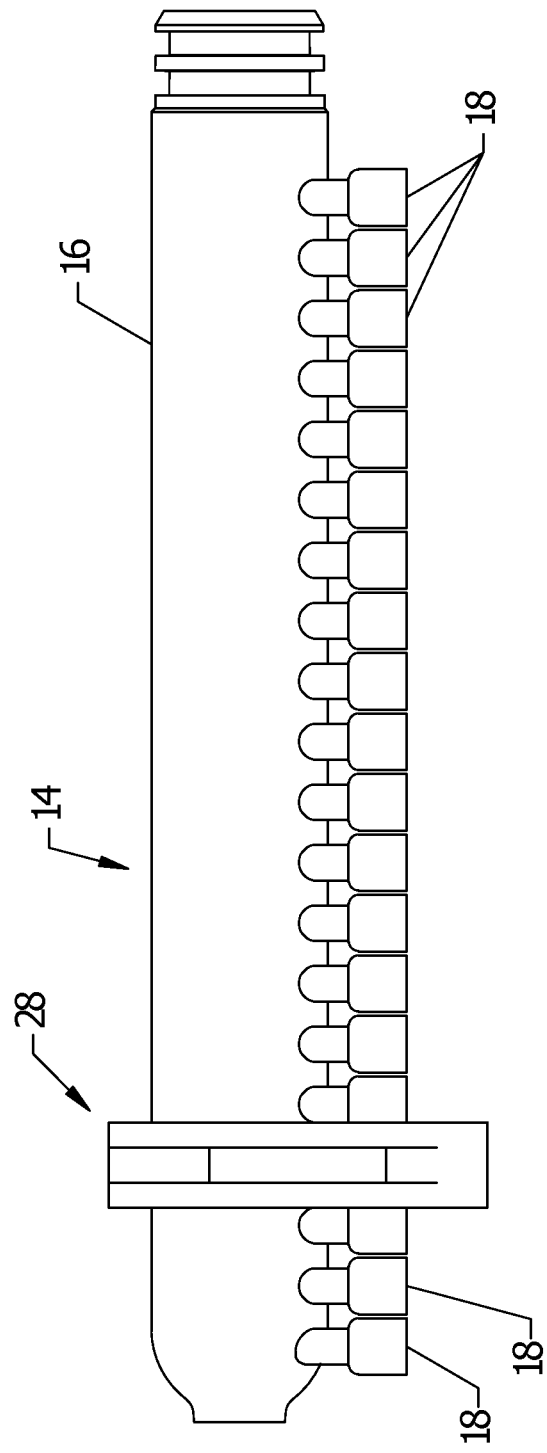
FIG. 7 is a top plan view, enlarged for detail, showing the cutting jig engaged on the end cap/manifold.
Figure 8:
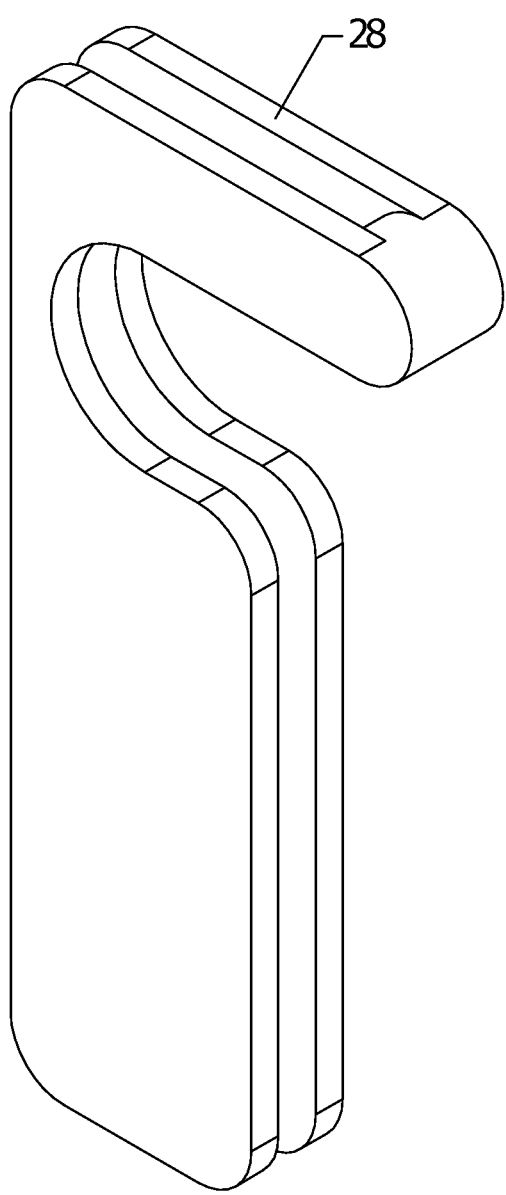
FIG. 8 shows the cutting jig in perspective.
Figure 9:
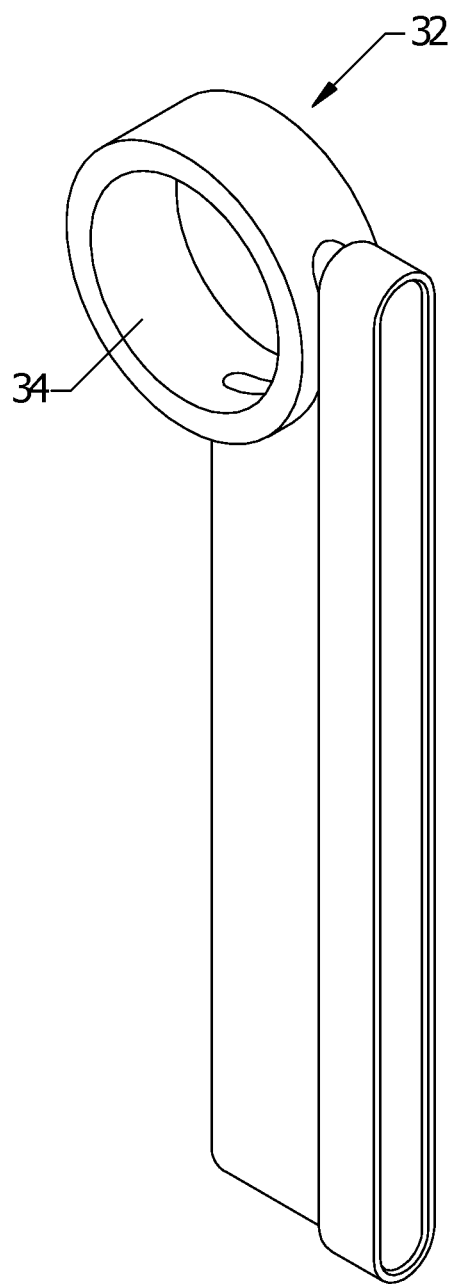
FIG. 9 is a perspective view showing a replacement plate end cap of the invention.
Figure 10:
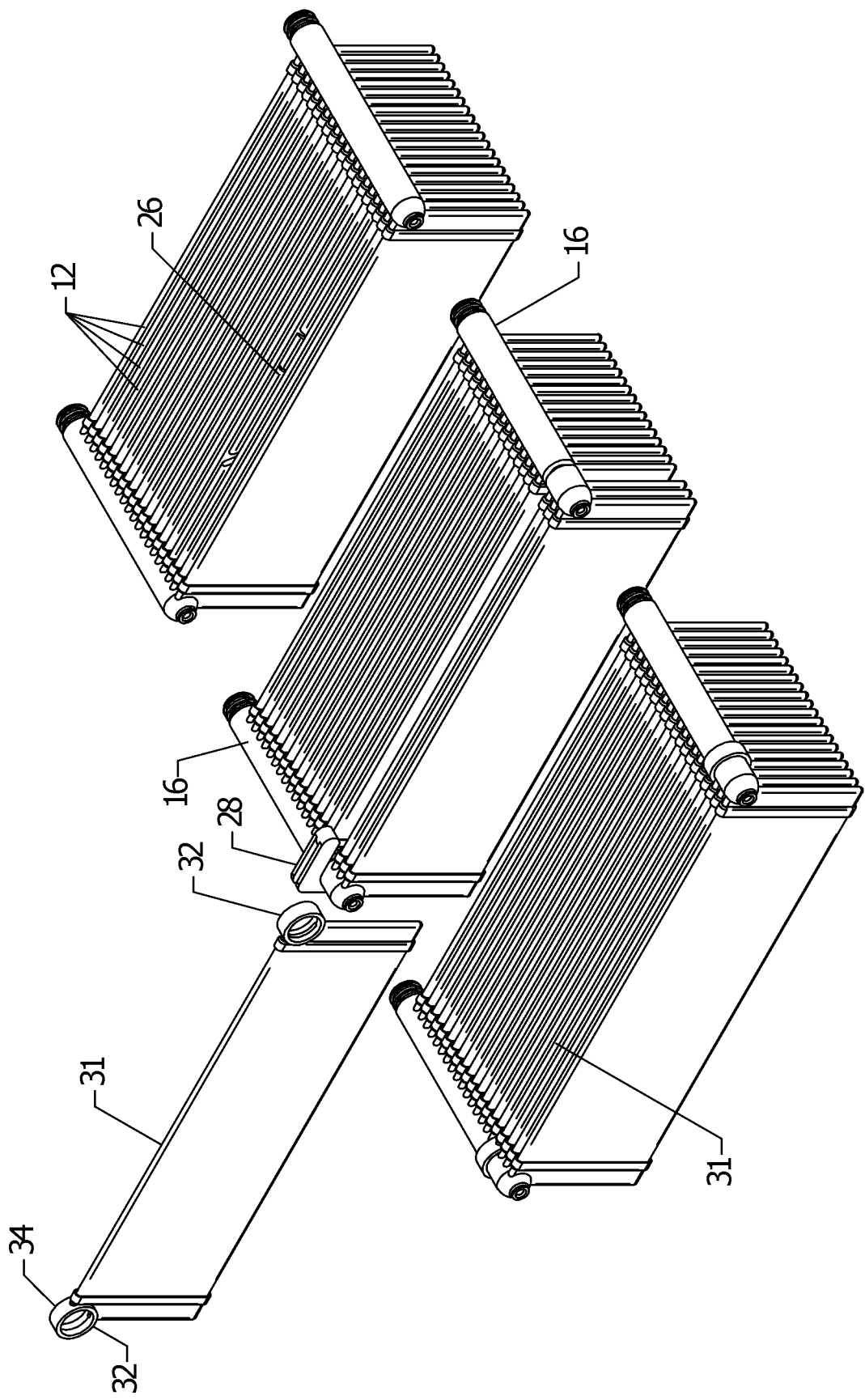
FIG. 10 is a perspective view showing an assembly or cassette of plates, retained by end caps/manifolds, and indicating removal and replacement of a broken plate, in three stages.

FIG. 4 shows the assembly 10 in plan view, while FIG. 5 shows the same assembly but with a broken membrane plate 26 being removed. FIGS. 5 through 10 indicate the procedure for removal and replacement of a broken ceramic plate. In FIG. 6, which is a cross sectional view in elevation looking at one of the flat plate membranes 12, a jig 28 is shown engaged onto the manifold/end cap header 16. The jig 28 is also shown in FIGS. 7, 8 and 10. Note that the FIG. 6 view of the jig 28 is also in cross section. FIG. 7 further illustrates the use of a jig, and FIG. 8 shows the jig itself. The cut line 30 of a hacksaw blade is also indicated in FIG. 6, with the jig providing guidance for cutting through the header 16 in order to receive a section of header. Two parallel cuts are made, as indicated in FIG. 10, so that a gap is cut out of the header, the gap being sufficiently wide as to encompass the header at both sides of the narrow neck 22 of an end cap, that neck being, in one example, about 7 mm in width. Once both headers 16 have been cut, as illustrated in FIG. 10, each header is thereby separated into two pieces, each retaining remaining membrane plates 12. The broken plate 26 has been removed in FIG. 10, simply by lifting out that plate with its attached end caps and short sections of header, one at each end.

The cuts through the header pipe can be made without a jig if desired; also, a grinder could be used rather than a blade.

FIG. 7 shows the end cap/manifold 14 in greater detail, with the cutting jig 28 engaged. In this view the cuts have been made and the section of header/end cap removed. The drawing shows that the integral end caps of the end cap/manifold structure 14 are very close together, as close as molding will permit, separated by a space of about 1 mm or less. These could be joined in molding, but to better facilitate removal and replacement of plates they preferably are separated or just minimally connected as mentioned above.

FIG. 10 shows a replacement plate 31, with a special end cap replacement section 32 at each end. The end cap or end cap replacement section 32 is also shown in FIG. 9, prior to being attached to a ceramic plate.

FIG. 10 shows that, with a broken or defective plate 26 having been removed from the assembly of plates, leaving a gap, the replacement plate 31 with special end caps 32 is moved into position. The manifold 16 can be spread apart to accommodate an annular collar 34 of the end cap 32, which has a greater width than the gap, i.e. wider than the portion of manifold that has been removed. The manifold sections are then moved back into place, over the collars, with adhesive sealant applied to permanently attach the collars to the manifolds. For an end cap/manifold structure with neck width about 7 mm, as above, the collar 34 can have a width of about 19 mm.

Figure 9A:
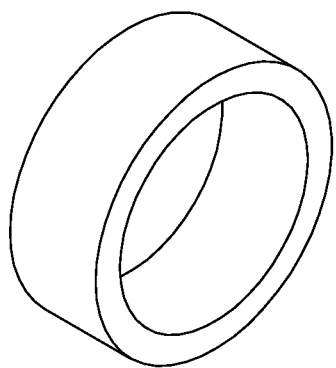
FIG. 9A is a perspective view showing a repair coupling as an alternative to the device shown in FIG. 9.

It is also possible after removal of a membrane plate to simply repair the break in the header 16 without replacing the defective membrane plate. Coupling sleeves such as shown in FIG. 9A rejoin the separated sections of the header.

FIG. 7 shows the end caps 18 spaced only slightly apart, as close as practicable for molding the structure, preferably by injection molding. As noted above, they could actually be connected, with no gap between them, and a saw blade could be used to cut between end caps to extract that section of the header pipe 14.

Figure 11:
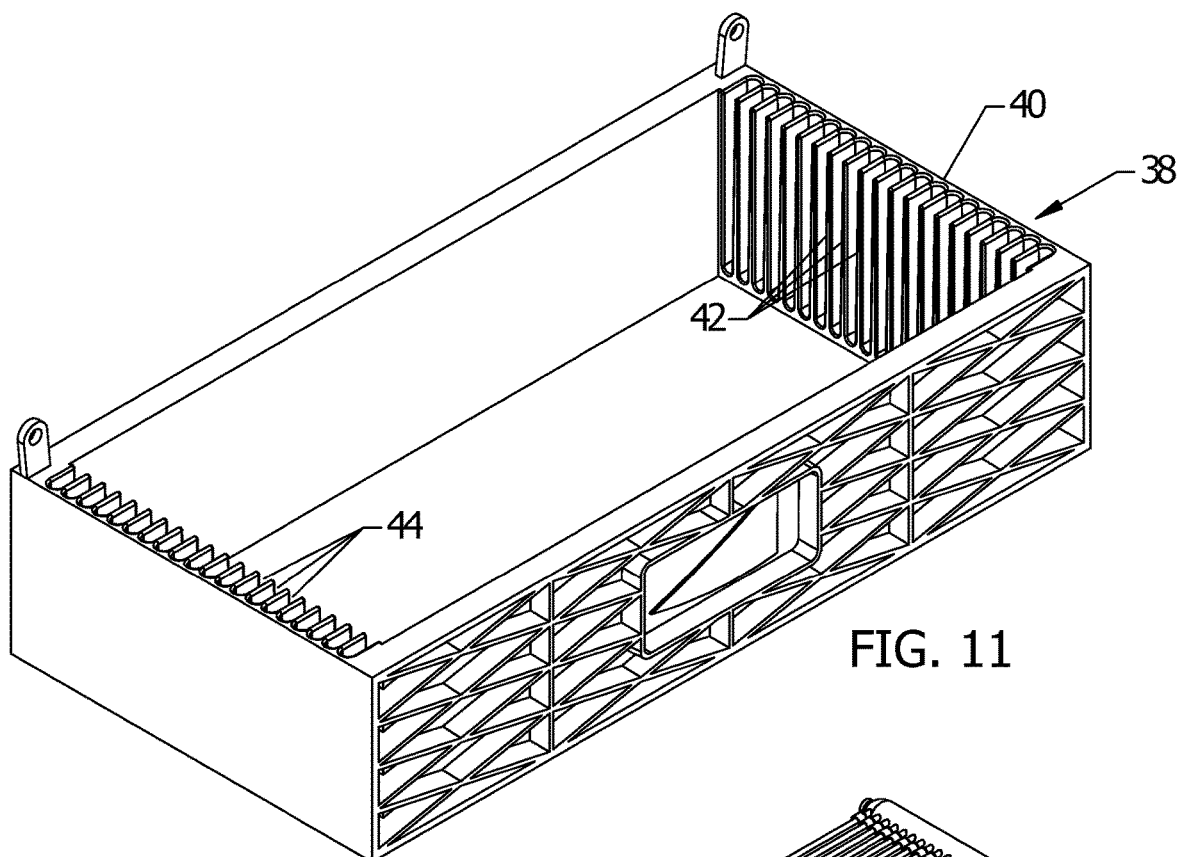
FIG. 11 is a perspective view showing an external frame module for receiving the assembly plates as in FIG. 1.
Figure 12:
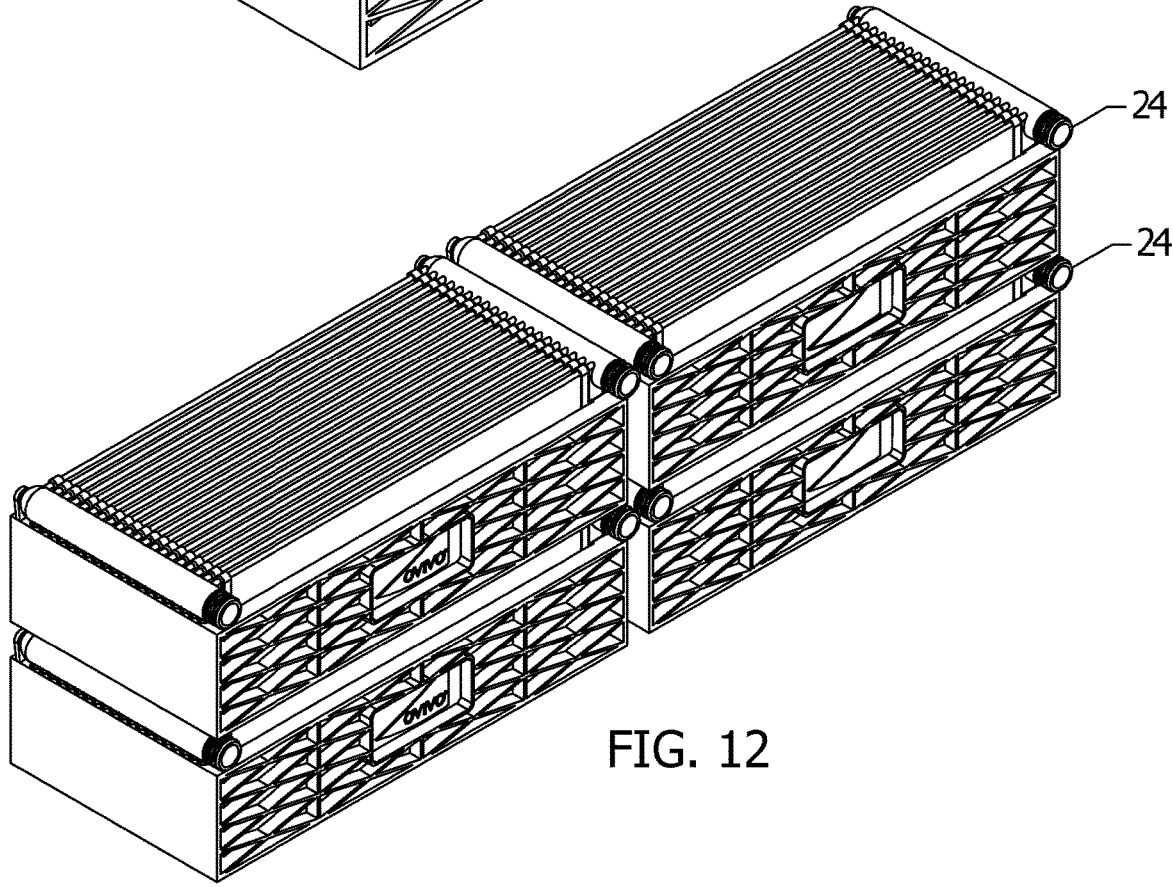
FIG. 12 is a perspective view indicating stacking and ganging of plate assemblies retained in external frame modules.

FIGS. 11 and 12 show a one piece external frame module 38, preferably integrally molded of plastic, that is configured to receive the assembly or cassette of plates 12 with end caps/headers 14, such as shown in FIG. 1. As the drawing reveals, internal end walls 40 of the module 38 preferably have series of vertically extending parallel grooves 42 into which outside ends 44 of the end caps 14 can slide, for a secure and supportive fit with the module if added structure is needed for that purpose. FIG. 12 shows assemblies of plates contained in the modules, with four of the plate-carrying modules 38 arranged in stacked and side-by-side arrangement. Permeate from all of these sets of plates can be carried away in pipes connected to the exit ducts 24. Suction is applied to the membranes via these outlet ducts 24.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A membrane filtration system with a series of microfiltraton membranes receiving liquid at outer surfaces to remove contaminants and create a permeate interior of the membranes, the permeate being conducted away through pipes, the system comprising:

the membranes being ceramic flat plate membranes positioned in side-by-side parallel planar arrangement, the membrane plates being in a plate assembly which includes, at least at one end of the series of plates, an end cap/manifold structure of molded plastic material, having a generally horizontal header at an upper side and a series of vertically oriented end caps, each with a slot fitting closely over the end of a plate and being glued thereto, the end caps being in fluid communication with the header so that the end caps receive permeate from the membranes to liquid connect the permeate from the plates into the header, and the plate assembly being without O-rings at end caps, whereby the membrane plates are retained in the assembly by the end cap/manifold structure and are connected securely and in fluid-tight relationship with the end cap/manifold structure without O-rings.

2. The membrane filtration system of claim 1, wherein the end cap/manifold structure is integrally molded as one piece.

3. The membrane filtration system of claim 1, further including replacement end cap sections for replacement of damaged plates, each of the replacement end cap sections having a coupling or collar to fit closely over the header pipe and having a replacement end cap integral with and extending down from the coupling or collar, the replacement end cap having a slot to fit closely over an end of a replacement membrane plate, whereby the header pipe in a plate assembly with a damaged plate can be ground out or cut through in two places either side of an integral end cap of the assembly to remove the damaged plate and a short section of header, after which a replacement plate having a replacement end cap section at one or both ends can be put into place with the coupling or collar of the replacement end cap section slipped over the header pipe and secured thereto by adhesive.

4. The membrane filtration system of claim 1, further including repair couplings for the header to fit closely over the header, whereby the header pipe in a plate assembly with a damaged plate can be ground out or cut through in two places either side of an integral end cap of the assembly to remove the damaged plate and a short section of header, after which a repair coupling can be put into place with the repair coupling slipped over the header to join separated sections of the header together, secured by adhesive.

5. The membrane filtration system of claim 1, wherein the membrane filtration system receives treated wastewater in a wastewater treatment plant.

\* \* \* \* \*